US007087206B2

(12) United States Patent
Bond et al.

(10) Patent No.: US 7,087,206 B2
(45) **Date of Patent: *Aug. 8, 2006**

(54) MULTICOLUMN SELECTIVITY INVERSION GENERATOR FOR PRODUCTION OF HIGH PURITY ACTINIUM FOR USE IN THERAPEUTIC NUCLEAR MEDICINE

(75) Inventors: Andrew H. Bond, Hoffman Estates, IL (US); E. Philip Horwitz, Naperville, IL (US); Daniel R. McAlister, Alsip, IL (US)

(73) Assignee: PG Research Foundation, Darien, IL (US)

( * ) Notice: Subject to any disclaimer, the term of this patent is extended or adjusted under 35 U.S.C. 154(b) by 674 days.

This patent is subject to a terminal disclaimer.

(21) Appl. No.: 10/261,031

(22) Filed: Sep. 30, 2002

(65) Prior Publication Data

US 2003/0194364 A1 Oct. 16, 2003

Related U.S. Application Data

(63) Continuation-in-part of application No. 10/159,003, filed on May 31, 2002, now Pat. No. 6,852,296.

(60) Provisional application No. 60/372,327, filed on Apr. 12, 2002.

(51) Int. Cl.
*C22B 60/00* (2006.01)
*C01G 57/00* (2006.01)

(52) U.S. Cl. ...................... 423/2; 423/3; 423/6; 423/7; 423/11; 423/249; 423/DIG. 7; 210/682

(58) Field of Classification Search .................... 423/2, 423/3, 6, 7, DIG. 7, 11, 249; 210/682
See application file for complete search history.

(56) References Cited

U.S. PATENT DOCUMENTS

| | | | | |
|---|---|---|---|---|
| 4,265,862 | A * | 5/1981 | White et al. | 423/21.1 |
| 4,548,790 | A | 10/1985 | Horwitz et al. | |
| 4,574,072 | A | 3/1986 | Horwitz et al. | |
| 4,835,107 | A | 5/1989 | Horwitz et al. | |
| 5,246,691 | A | 9/1993 | Geerlings et al. | |
| 5,641,471 | A | 6/1997 | Geerlings | |
| 5,854,968 | A * | 12/1998 | Horwitz et al. | 423/2 |
| 5,885,465 | A * | 3/1999 | Bray et al. | 210/681 |
| 6,127,527 | A | 10/2000 | Geerlings | |

(Continued)

FOREIGN PATENT DOCUMENTS

JP 2002001007 A 1/2002

(Continued)

OTHER PUBLICATIONS

Adelstein et al. Eds., *Isotopes for Medicine and the Life Sciences*, National Academy Press (Washington, D.C.: 1995), pp. i-x and 1-8.

(Continued)

*Primary Examiner*—Ngoc-Yen Nguyen
(74) *Attorney, Agent, or Firm*—Welsh & Katz, Ltd.

(57) ABSTRACT

A multicolumn selectivity inversion generator separation method has been developed in which actinium ions, a desired daughter radionuclide, are selectively extracted from a solution of the thorium parent and daughter radionuclides by a primary separation column, stripped, and passed through a second guard column that retains any parent or other daughter interferents, while the desired daughter actinium ions and radium ions elute. This separation method minimizes the effects of radiation damage to the separation material and permits the reliable production of radionuclides of high chemical and radionuclidic purity for use in diagnostic or therapeutic nuclear medicine.

23 Claims, 4 Drawing Sheets

U.S. PATENT DOCUMENTS

| | | | | |
|---|---|---|---|---|
| 6,403,771 | B1 * | 6/2002 | Geerlings | 530/413 |
| 6,667,024 | B1 * | 12/2003 | Goldenberg et al. | 424/1.49 |
| 6,770,195 | B1 | 8/2004 | Young et al. | |
| 6,787,042 | B1 | 9/2004 | Bond et al. | |
| 2003/0127395 | A1 * | 7/2003 | Bond et al. | 210/682 |

FOREIGN PATENT DOCUMENTS

| | | |
|---|---|---|
| JP | 2002243890 | 8/2002 |

OTHER PUBLICATIONS

Bond et al., "Nuclear Separations for Radiopharmacy: The Need for Improved Separations to Meet With Future Research and Clinical Demands", *Ind. Eng. Chem. Res.* (2000) 36:3130-3134.

Choppin et al., *Nuclear Chemistry: Theory and Applications*, Pergamon Press (Oxford: 1980), p. 310-312.

Hassfjell et al., "The Development of the α-Particle Emitting Radionuclides $^{212}Bi$ and $^{213}Bi$, and Their Decay Related Radionuclides, for Therapeutic Applications", *Chem. Rev.* (2001) 101:2019-2036.

Horwitz et al., "Separation and Preconcentration of Strontium for Biological, Environmental, and Nuclear Waste Samples by Extraction Chromatography Using a Crown Ether", *Analytical Chemistry* (1991) 63:522-525.

Imam, "Advancements in Cancer Therapy with Alpha-Emitters: A Review", *Int. J. Radiation Oncology Biol. Phys.* (2001) 51(1):271-278.

Lambrecht et al., "Radionuclide Generators", *Radiochimica Acta* (1997) 77:103-123.

McDevitt et al., "Tumor Therapy with Targeted Atomic Nanogenerators", *Science* (Nov. 2001) 294:1537-1540.

Mirzadeh, "Generator-Produced Alpha-Emitters", *Appl. Radiat. Isot.* (1998) 49(4):345-349.

Sasaki et al., "The Novel Extractants, Diglycolamides, for the Extraction of the Lanthanides and Actinides in $HNO_3$-*n*-Dodecane System", *Solvent Extraction and Ion Exchange* (2001) 19(1):91-103.

Sasaki et al., "Extraction of Actinides (III), (IV), (V), (VI), and Lanthanides (III) by Structurally Tailored Diamides", *Solvent Extraction and Ion Exchange* (2002) 20(1):21-34.

Tachimori, "A New Extractant for Actinide Separation Developed: Separation and Recovery of All Actinides with High Efficiency", www.jaeri.go.up/English/press/00808, (Aug. 8, 2000).

Wagner et al., "Expert Panel: Forecast Future Demand for Medical Isotopes", Department of Energy, Office of Nuclear Energy, Science, and Technology 1999.

Whitlock et al., "Radionuclide Therapy for the Treatment of Microscopic Ovarian Carcinoma: An Overview", *Ind. Eng. Chem. Res.* (2000) 39:3135-3139.

* cited by examiner

MULTICOLUMN SELECTIVITY INVERSION GENERATOR FOR PRODUCTION OF HIGH PURITY ACTINIUM FOR USE IN THERAPEUTIC NUCLEAR MEDICINE

CROSS-REFERENCE TO RELATED APPLICATIONS

This is a continuation-in-part of provisional application Ser. No. 60/372,327 filed Apr. 12, 2002 and a continuation-in-part of application Ser. No. 10/159,003 filed May 31, 2002 now U,.S. Pat. No. 6,852,296.

BACKGROUND ART

The use of radioactive materials in diagnostic medicine has been readily accepted because these procedures are safe, minimally invasive, cost effective, and they provide unique structural and/or functional information that is otherwise unavailable to the clinician. The utility of nuclear medicine is reflected by the more than 13 million diagnostic procedures that are performed each year in the U.S. alone, which translates to approximately one of every four admitted hospital patients receiving a nuclear medical procedure. [Adelstein et al. Eds. *Isotopes for Medicine and the Life Sciences*; National Academy Press: Washington, D.C., 1995; Wagner et al., "Expert Panel: Forecast Future Demand for Medical Isotopes," Department of Energy, Office of Nuclear Energy, Science, and Technology, 1999; Bond et al., *Industrial and Engineering Chemistry Research* 2000, 39, 3130-3134.]

The use of radiation in disease treatment has long been practiced, with the mainstay external beam radiation therapy now giving way to more targeted delivery mechanisms including sealed-source implants containing palladium-103 or iodine-125 that are employed in the brachytherapeutic treatment of prostate cancer and samarium-153 or rhenium-188 that are conjugated to diphosphonate-based biolocalization agents that concentrate at metastasis in the palliation of bone cancer pain. More recently, the U.S. Food and Drug Administration (FDA) has approved use of the first radioimmunotherapy (RIT) drug that relies on radionuclide conjugation to peptides, proteins, or antibodies to selectively concentrate at the disease site whereby radioactive decay imparts cytotoxic effects. Radioimmunotherapy represents the most selective means of delivering a cytotoxic dose of radiation to diseased cells while sparing healthy tissue, [Geerlings et al., Akzo Nobel, N. V.: US, 1993; Whitlock et al., *Industrial and Engineering Chemistry Research* 2000, 39, 3135–3139; Imam, *Int. J. Radiation Oncology Biol. Phys*. 2001, 51, 271–278; Hassfjell et al., *Chemical Reviews* 2001, 101, 2019-2036; McDevitt et al., *Science* 2001, 294, 1537–1540] and the plethora of information about disease genesis and function arising from the human genome project and proteomics technologies is expected to propel RIT into a leading treatment for micrometastatic carcinoma (e.g., lymphomas and leukemias) and small- to medium-sized tumors.

Because of their use in medical procedures, various governing bodies (e.g., the U.S. FDA) mandate rigorous purity requirements for radiopharmaceuticals. Regulations governing the use of radionuclides for therapeutic applications are even more stringent, and such strict regulation is warranted given the greater potential harm posed by long-lived high linear energy transfer (LET) radionuclidic impurities. Manufacturers that can ensure the production of therapeutically useful radionuclides with the following three characteristics will be at a significant advantage entering the FDA review process and, subsequently, in the deployment of their products in the medical technology markets:

(1) High radionuclidic purity;
(2) High chemical purity; and
(3) Predictable purification methods and reliable production schedules.

The need to ensure high radionuclidic purity stems directly from the hazards associated with the introduction of long-lived or high energy radioactive impurities into a patient, especially if the biolocalization and body clearance characteristics of the radioactive impurities are unknown. Radionuclidic impurities pose the greatest threat to patient welfare, and such contaminants are the primary focus of clinical quality control measures that attempt to prevent the administration of harmful, and potentially fatal, doses of radiation to the patient.

Chemical purity is vital to a safe and efficient medical procedure because the radionuclide must generally be conjugated to a biolocalization agent prior to use. This conjugation reaction relies on the principles of coordination chemistry wherein a cationic radionuclide is chelated to a ligand that is covalently attached to a biolocalization agent. In a chemically impure sample, the presence of ionic interferents can inhibit formation of the radioimmunoconjugate resulting in a substantial quantity of radionuclide not bound to the biolocalization agent. Therapeutic radionuclides not associated with a biolocalization agent not only pose a health concern if administered, but represent an inefficient use of both the radionuclide and the costly biolocalization agent.

Candidate radionuclides for RIT typically have coordination chemistry that permits attachment to various biolocalization agents, radioactive half-lives in the range of 30 minutes to several days, a convenient generator or nucleosynthesis-based production route, and a comparatively high LET. The LET is defined as the energy deposited in matter per unit path length of a charged particle, [Choppin, et al., *J. Nuclear Chemistry: Theory and Applications*; Pergamon Press: Oxford, 1980] and the LET of α-particles is substantially greater than $\beta^-$-particles. By example, α-particles having a mean energy in the 5–9 MeV range typically expend their energy within about 50–90 μm in tissue, which corresponds to several cell diameters. The lower LET $\beta^-$-particles having energies of about 0.5–2.5 MeV may travel up to 10,000 μm in tissue, and the lower LET requires as many as 100,000 $\beta^-$-emissions at the cell surface to afford a 99.99% cell-kill probability. For a single α-particle at the cellular surface, however, the considerably higher LET provides a 20–40 percent probability of inducing cytotoxicity as the lone α-particle traverses the nucleus. [Hassfjell et al., *Chemical Reviews* 2001, 101, 2019–2036.]

Bismuth-213 is the most attractive candidate for α-particle RIT, but its supply chain is in need of optimization. Uranium-233 is the longest lived radionuclidic parent of $^{213}$Bi, and it was this fissile isotope of uranium that was synthesized by neutron irradiation of thorium-232 for defense purposes. During neutron irradiation of $^{232}$Th, however, competing nuclear reactions yielded small quantities of uranium-232 ($^{232}$U). The $^{232}$U contaminant is problematic for two principal reasons:

(1) Decay of $^{232}$U leads to gaseous radon-220 with a 55.6 second half-life, which can migrate during processing and raises contamination concerns; and
(2) Decay of $^{232}$U also leads to thallium-208 that has a high energy (2.6 MeV) γ emission that cannot be effectively shielded; thus, exposing both the patient and the clinical personnel to undesirable and potentially harmful radiation.

The most feasible means of obtaining pure $^{213}$Bi from $^{229}$Th containing trace contaminants of thorium-228 ($^{228}$Th) is to selectively isolate $^{225}$Ac. Current processing schemes adopt a linear multi-step approach in which $^{225}$Ra and $^{225}$Ac (and the radium-224 contaminant) are eluted in concentrated nitric acid from an anion-exchange column that retains both $^{229}$Th and $^{228}$Th. A subsequent separation of $^{225}$Ac from $^{225}$Ra and $^{224}$Ra is performed prior to deposition of the $^{225}$Ac on a support material for generator shipment. The retention of macroconcentrations of Th(IV) on anion-exchange resins is cumbersome and inefficient as the Th(IV) must be regularly eluted from the large anion-exchange columns to minimize radiolytic degradation. Inefficient elution at this stage results in losses of the precious $^{229}$Th source material.

The same LET that makes α- and $\beta^-$-emitting nuclides potent cytotoxic agents for cancer therapy also introduces many unique challenges into the production and purification of these radionuclides for use in medical applications. In fact, a major hurdle currently limiting the use of α-particles in RIT stems primarily from issues of availability.

The most convenient source of the $^{213}$Bi precursor $^{225}$Ac is $^{229}$Th, which can be gleaned from $^{233}$U stockpiles previously amassed by the U.S. government. The purified $^{229}$Th can then be used as an cc-particle source material for RIT. Thus, the vital aspects of the production of $^{225}$Ac include preservation of the $^{229}$Th parent source material, efficient recovery and use of the $^{225}$Ra parent of $^{225}$Ac, and the chemical isolation of $^{225}$Ac that breaks the $^{224}$Ra decay chain leading to highly undesirable radionuclidic contaminants.

As discussed above, the use of high LET α-emitting radiation holds great promise for the therapy of micrometastatic carcinoma, but realization of the full potential of targeted radiotherapy requires the development of ample supplies and reliable generators for high LET radionuclides. [Geerlings et al., Akzo Nobel, N. V.: U.S. Pat. No. 5,246,691, 1993; Whitlock et al., *Industrial and Engineering Chemistry Research* 2000, 39, 3135–3139; Imam, *Int. J. Radiation Oncology Biol. Phys.* 2001, 51, 271–278; Hassfjell et al., *Chemical Reviews* 2001, 101, 2019–2036; McDevitt et al., *Science* 2001, 294, 1537–1540] One candidate α-emitter proposed for use in cancer therapy is $^{213}$Bi [Geerlings et al., Akzo Nobel, N. V.: U.S. Pat. No. 5,246,691, 1993; Imam, *Int. J. Radiation Oncology Biol. Phys.* 2001, 51, 271–278; Hassfjell et al., *Chemical Reviews* 2001, 101, 2019-2036] which forms as part of the $^{233}$U decay chain.

Bismuth-213 has recently been obtained for use by elution from a conventional generator in which the relatively long-lived (i.e., 10.0 day) $^{225}$Ac parent is retained on an organic cation-exchange resin while the $^{213}$Bi is eluted with HCl [Hassfjell et al., *Chemical Reviews* 2001, 101, 2019–2036; Lambrecht et al., *Radiochimica Acta* 1997, 77, 103–123; Mirzadeh, *Applied Radiation and Isotopes* 1998, 49, 345–349] or mixtures of $Cl^-$ and $I^-$. [Hassfjell et al., *Chemical Reviews* 2001, 101, 2019–2036; Lambrecht et al., *Radiochimica Acta* 1997, 77, 103–123; Mirzadeh, *Applied Radiation and Isotopes* 1998, 49, 345–349; Geerlings; Akzo Nobel, N. V.: U.S. Pat. No. 5,641,471, 1997; Geerlings; Akzo Nobel, N. V.: U.S. Pat. No. 6,127,527, 2000.] This generator strategy suffers from the adverse effects of radiolytic degradation of the support material that leads to low yields of impure $^{213}$Bi and to erratic generator behavior. In order for $^{213}$Bi to be successfully deployed in cancer therapy, a new generator technology must be developed.

The multicolumn selectivity inversion generator (MSIG) described in application Serial No. 60/372,327 filed Apr. 12, 2002 is capable of reliably producing near theoretical yields of $^{213}$Bi of exceptionally high radionuclidic and chemical purity. By minimizing the adverse effects of radiolytic degradation of the support material, this $^{213}$Bi generator operates at predictably high efficiency over the entire duty cycle. In addition to exceeding the vital purity criteria, the purified $^{213}$Bi product is delivered in a small volume of NaCl/(Na,H)OAc buffer solution at pH=4.0, which is seamlessly integrated into the radioconjugation reaction involving the biolocalization agent. The operational simplicity of the multicolumn selectivity inversion generator for the production-scale purification of $^{213}$Bi is ideally suited to automation, which is more efficient and reduces the probability of human error to ensure that more patients can be safely treated with $^{213}$Bi α-particle immunotherapy. Because this $^{213}$Bi generator technology is downstream from $^{225}$Ac production and purification, the product emerging from the $^{225}$Ac purification method under development should be compatible with this $^{213}$Bi generator technology. The input medium for the $^{213}$Bi generator is 0.10 M HCl, which places a restriction on the output from the $^{225}$Ac purification process. One restriction, by example, would be that use of an acidic extraction reagent could not immediately precede the $^{225}$Ac purification process, as $^{225}$Ac would be most conveniently stripped from such a reagent using high concentrations (i.e., greater than 1 M) of a strong acid. Thus, overall integration of the separations processes into the global $^{213}$Bi production flowsheet is an important facet of the design of a new $^{225}$Ac purification technology.

An ideal $^{225}$Ac production technology should offer operational simplicity and convenience as well as reliable production of near theoretical yields of the desired $^{225}$Ac radionuclide, preferably having high chemical and radionuclidic purity. Current production methods of $^{225}$Ac are poorly suited, however, to systems involving macroconcentrations of radionuclidic parents and the high LET radionuclides useful in therapeutic nuclear medicine also can damage the separations media.

BRIEF DESCRIPTION OF THE INVENTION

This invention contemplates an alternative technology for the purification of actinium(III) cations such as $^{225}$Ac using a multicolumn selectivity inversion generator wherein $^{225}$Ac and its immediate radiogenic parent radium(II) cations such as $^{225}$Ra are efficiently removed from solutions containing thorium(IV) cations such as $^{229}$Th and the radioisotopic impurity $^{228}$Th. The purification process uses radiolytically robust solutions, comparatively small chromatographic columns, rapid column flow rates to minimize radiolytic degradation of the separations media, and efficiently utilizes the $^{225}$Ra source material to optimize $^{225}$Ac recovery in an efficient process.

A method for producing a solution of actinium and optionally present radium daughter radionuclide ions that is substantially free of thorium parental radionuclide ion impurities is contemplated. More specifically, a contemplated method comprises the steps of:

(a) contacting an aqueous, preferably acidic, parent-daughter radionuclide ion solution having a pH value of about 8 or less. The solution at least contains sulfate ions as well as thorium parental radionuclide ions and actinium and optionally present radium desired daughter radionuclide ions with a first solid phase separation medium having a high affinity for the desired daughter radionuclide ions and a low affinity for the parent radionuclide ions. That contact is maintained for a time period sufficient for said actinium and optionally present radium ions to be bound to form a desired daughter ion-laden first separation medium and a thorium ion-containing, desired daughter-depleted parent-daughter solution.

(b) The desired daughter-depleted parent-daughter solution (thorium-containing, actinium-depleted and optionally radium-depleted solution) is separated from the solid phase desired daughter ion-laden first separation medium.

(c) The desired daughter radionuclide is stripped from the desired daughter-laden first separation medium with an aqueous nitric or hydrochloric acid solution to form an aqueous solution of actinium and optionally present radium desired daughter radionuclide ions that may contain trace amounts of parental thorium ion impurities. This stripped solution can be collected (recovered) for further use in the preparation of bismuth radionuclide ions for binding to a biolocalization agent or otherwise reacted to form a desired medicinal preparation, but is preferably contacted with a second separation medium as discussed below.

(d) That aqueous nitric or hydrochloric acid solution of step (c) is contacted with a second solid phase separation medium that has a high affinity for the parent thorium radionuclide ions and a low affinity for the actinium and optionally present radium desired daughter radionuclide. Illustrative second separation media include: (a) a separation medium that contains a dipentyl pentyl phosphonate (DAAP) extractant (UTEVA® or UTEVA®-2 Resin) coated on an inert solid phase support, (b) a mixture of trioctyl and tridecyl methyl ammonium chloride or nitrate extractants (TEVA® Resin) sorbed on a water-insoluble inert support, (c) an anion-exchange resin, or (d) 40 percent 2-ethylhexyl-2-ethylhexylphosphonic acid on an inert chromatographic substrate. That contact is maintained for a time period sufficient for the parent thorium radionuclide to be bound by the second solid phase separation medium to form a solution of actinium and optionally present radium desired daughter radionuclide ions that is highly purified and is substantially free of thorium parental radionuclide ion impurities. The solution so formed can also be collected (recovered) as discussed above, but is preferably contacted with a third separation medium as discussed below.

(e) The solid and solution phases are separated to provide a solution of actinium and optionally present radium desired daughter radionuclide ions that is highly purified and is substantially free of thorium parental radionuclide ion impurities.

In preferred practice, the method includes further steps that include:

(f) contacting the separated solution of step (e) with a solid phase third separation medium that provides a decontamination factor of about $10^2$ or greater for the actinium ions from radium ions under the conditions of contact. Exemplary third separation media include a medium comprised of a tetra-$C_1$-$C_{10}$-alkyl diglycolamide such as N,N,N',N'-tetra-n-octyl diglycolamide (TO-DGA) coated on inert support particles or octyl(phenyl)-N,N-diisobutylcarbamoylmethylphosphine oxide, known in the art as CMPO, dissolved in tri-n-butyl phosphate and coated on an inert solid phase support particles that are referred to herein as Yttrium Resin and TRU Resin, respectively. That contact is maintained for a time period sufficient to form solid phase actinium-laden separation medium and a radium ion-containing, actinium-depleted solution.

(g) The solid and liquid phases so formed are separated.

(h) The actinium ions are stripped from the solid phase actinium-laden separation medium with dilute hydrochloric acid (e.g. a solution having an HCl concentration of about $10^{-5}$ or less to about 3 molar) to form a solution of actinium ions in hydrochloric acid. That hydrochloric acid solution is thereafter typically used as feed source of pure actinium for the preparation of bismuth-213.

It is preferred that the decontamination factor for the first separation medium for the actinium desired daughter from the thorium parent radionuclide impurities under the conditions of contact is about $10^2$ or greater. It is also preferred that the decontamination factor for the second separation medium for the actinium desired daughter from the thorium parent radionuclide impurities under the conditions of contact is about $10^2$ or greater.

In another aspect of the invention, the separated thorium ion-containing, desired daughter-depleted parent-daughter solution of step (b) is maintained for a time period sufficient for an additional amount of actinium and optionally present radium daughter radionuclide ions to form by radioactive decay. An above separation method is thereafter repeated using that solution containing the newly formed actinium and radium radionuclide ions as said aqueous parent-daughter radionuclide ion solution having a pH value of about 8 or less that contains sulfate ions as well as parental thorium ions and actinium and optionally present radium ions.

The present invention has several benefits and advantages.

In one benefit, the method does not require the use of air or gas to separate some of the solutions from one another, which in turn provides better chromatographic operating performance and better overall separation efficiency.

An advantage of a contemplated method is that the separation media have longer useful lifetimes because they tend not to be degraded by radiation due to the relatively short time spent by high linear energy transfer radionuclides in contact with the media.

Another benefit of the invention is that high purity actinium can be obtained.

Another advantage of the invention is that the high separation efficiency of the separation media permits the actinium to be recovered in a small volume of eluate solution.

A still further benefit of the invention is that no change in the actinium-containing aqueous solution eluted from the last column is needed prior to contact of that solution with a separation medium useful for obtaining bismuth ions for use in medical treatments.

A still further advantage of the invention is that the chemical integrity of the separation medium is preserved, which provides a more predictable separation performance and reduces the likelihood of parent radionuclide contamination of the actinium product.

Still further benefits and advantages will be readily apparent to the skilled worker from the disclosures that follow.

BRIEF DESCRIPTION OF THE DRAWINGS

In the drawings forming a portion of this disclosure.

DETAILED DESCRIPTION OF PREFERRED EMBODIMENTS

Figure 1:
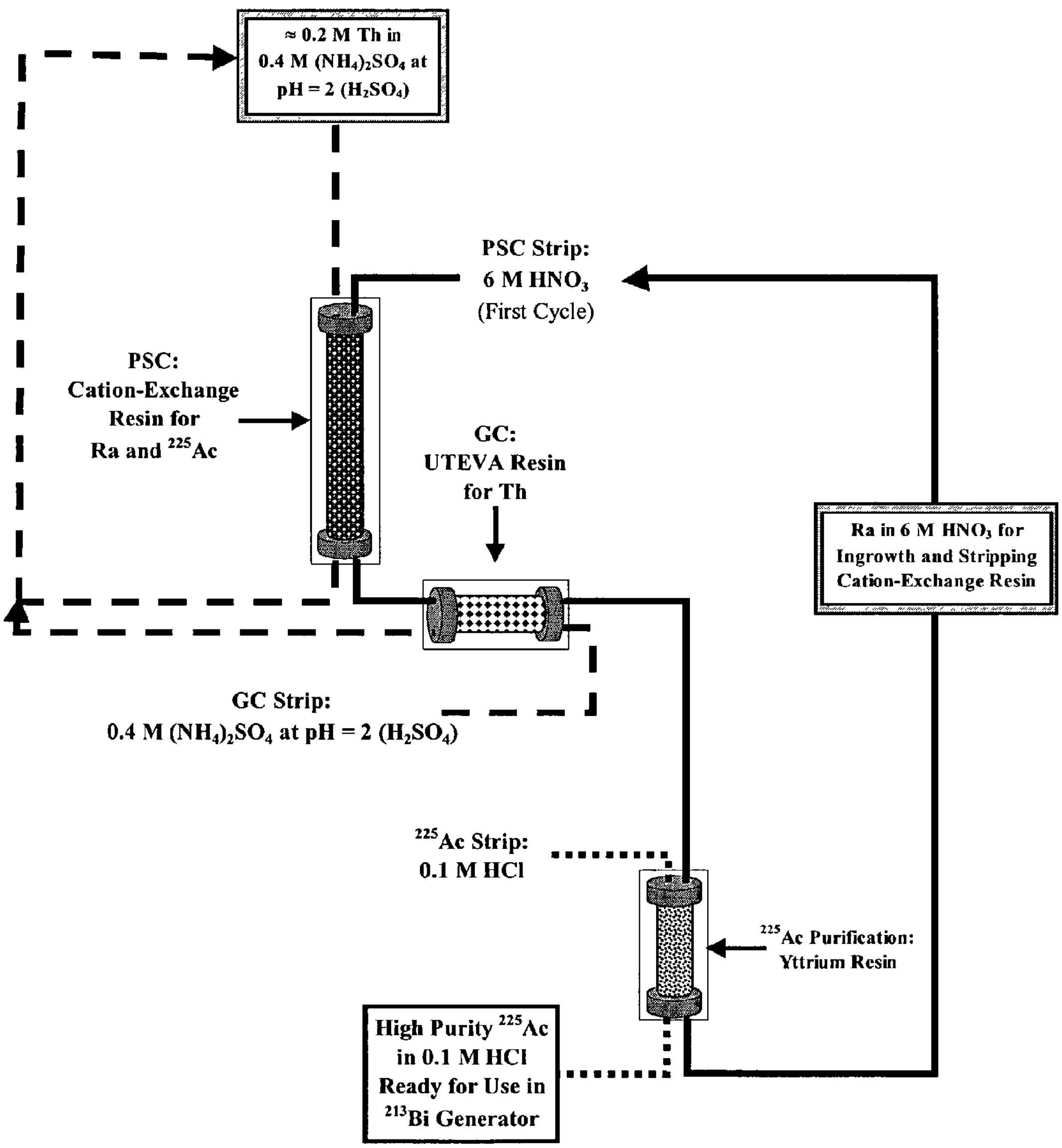
FIG. 1 is a schematic depiction of the separation of actinium(III) and radium(II), if present, from thorium(IV) using a multicolumn selectivity inversion generator described herein and in which PSC refers to Primary Separation Column, and GC refers to Guard Column and Yttrium Resin is present in a third column that separates actinium(III) from radium(II).

The present invention is particularly adapted for use in the preparation of purified actinium-225 ($^{225}Ac$) ions for the preparation of bismuth-213 ($^{213}Bi$) ions that are used in medical treatments. It is to be understood, however, that the contemplated separation process can be used with other isotopes than those specifically mentioned so long as those isotopes decay to form the recited daughter ions.

Radionuclide generators for the production of $^{213}Bi$ for use in radiotherapeutic applications rely on the efficient production of the $^{225}Ac$ parent radionuclide. A contemplated separation process or method for obtaining actinium ions in purified form comprises the steps of:

(a) contacting an aqueous, preferably acidic, parent-daughter radionuclide ion solution having a pH value of about 8 or less. The solution at least contains sulfate ions as well as thorium parental radionuclide ions and actinium and optionally present radium desired daughter radionuclide ions with a first solid phase separation medium having a high affinity for the desired daughter radionuclide ions and a low affinity for the parent radionuclide ions. That contact is maintained for a time period sufficient for said actinium and optionally present radium ions to be bound to form a desired daughter ion-laden first separation medium and a thorium ion-containing, desired daughter-depleted parent-daughter solution. That first separation medium preferably comprises a strong acid, sulfonate-containing polymeric extractant such as a cation-exchange resin as is discussed hereinafter. The aqueous, preferably acidic, sulfate solution of radioactive parent and daughters is preferably at about radioactive steady state as ions in solution prior to contacting the first separation medium.

(b) The desired daughter-depleted parent-daughter solution (thorium-containing, actinium-depleted and optionally radium-depleted solution) is separated from the solid phase desired daughter ion-laden first separation medium as by elution or decantation. Where the first separation medium is present in a chromatographic column, elution is preferred, and is usually followed by a rinse using a solution that is free of radionuclides but is otherwise similar in composition to the sulfate ion-containing solution used to load the separation medium. This first separated solution can be maintained for a time period sufficient for the desired daughter actinium ions to grow in or form by radioactive decay, and can thereafter be reseparated by contact with the same or a similar separation medium.

(c) The desired daughter radionuclide is stripped from the desired daughter-laden first separation medium with an aqueous nitric or hydrochloric acid solution to form an aqueous nitric or hydrochloric acid solution of actinium and optionally present radium desired daughter radionuclide ions that may contain trace amounts of parental thorium ion impurities. The acid concentration of either acid can be about 0.5 to about 8 M, and is preferably about 3 to about 6 M. This stripped solution can be collected (recovered) for further use in the preparation of bismuth radionuclide ions for binding to a biolocalization agent or otherwise reacted to form a desired medicinal preparation, but is preferably contacted with a second separation medium as discussed below.

(d) That aqueous nitric or hydrochloric acid solution of step (c) is contacted with a second solid phase separation medium that has a high affinity for the parent thorium radionuclide ions and a low affinity for the actinium and optionally present radium desired daughter radionuclide. Illustrative second separation media include (a) a separation medium that contains a dipentyl pentyl phosphonate (DAAP) extractant (UTEVA® or UTEVA®-2 Resin) coated on an inert solid phase support, (b) a mixture of trioctyl and tridecyl methyl ammonium chloride or nitrate extractants (TEVA® Resin) sorbed on a water-insoluble inert support, (c) an anion-exchange resin, or (d) 40 percent 2-ethylhexyl-2-ethylhexylphosphonic acid on an inert chromatographic substrate that is commercially available from Eichrom Technologies, Inc. Exemplary anion-exchange resins include Amberlite® IRA-900, IRA-904 and IRA-402 resins as well as the Dowex® 1X2–100, 1X2–400, and 1X4–200 resins that are available commercially from Sigma Chemical Co., St. Louis, Mo. That contact is maintained for a time period sufficient for the parent thorium radionuclide to be bound by the second solid phase separation medium to form a parental thorium-laden second separation medium and a solution of actinium and optionally present radium desired daughter radionuclide ions that is highly purified and is substantially free of thorium parental radionuclide ion impurities. The solution so formed can also be collected (recovered) as discussed above, but is preferably contacted with a third separation medium as discussed below.

(e) The solid and solution phases are separated to provide a solution of actinium and optionally present radium desired daughter radionuclide ions that is highly purified and is substantially free of thorium parental radionuclide ion impurities.

The parental thorium-laden second separation medium can be contacted with a sulfate ion-containing solution similar to the first sulfate ion-containing solution to strip the bound parental thorium ions from the separation medium to form a regenerated separation medium and a sulfate ion solution of parental thorium ions that can be added to the first separated thorium-containing, actinium- and radium-depleted solution and for a further separation of actinium ions formed by radioactive decay.

In preferred practice, the method includes further steps that include:

(f) separated nitric or hydrochloric acid solution of actinium ions and optionally present radium ions that is substantially free of parental thorium radionuclide ions of step (e) is contacted with a solid phase third separation medium that provides a decontamination factor of about $10^2$ or greater for the actinium ions from radium ions under the conditions of contact. Exemplary third separation media include a medium comprised of a tetra-$C_1$-$C_{10}$-alkyl diglycolamide such as N,N,N',N'-tetra-n-octyl diglycolamide (TO-DGA) coated on inert support particles or octyl(phenyl)-N,N-diisobutylcarbamoylmethylphosphine oxide, known in the art as CMPO, dissolved in tri-n-butyl phosphate and coated on inert solid phase support particles that are referred to herein as Yttrium Resin and TRU resin, respectively. That contact is maintained for a time period sufficient to form solid phase actinium-laden separation medium and a radium ion-containing, actinium-depleted solution. When radium ions are present in the nitric or hydrochloric acid solution, which is usually the case, those radium ions generally remain in the nitric or hydrochloric acid solution and are readily separable from the actinium-laden solid support particles.

(g) The solid and liquid phases so formed are separated, thereby providing a solution of purified radium ions and actinium-laden solid support particles. Where a chromatographic column is used, the radium ions pass through the column by elution.

(h) The actinium ions are stripped from the solid phase actinium-laden separation medium with dilute hydrochloric acid (e.g., a solution having an HCl concentration of about $10^{-5}$ or less to about 3 molar) to form a solution of actinium ions in hydrochloric acid. That hydrochloric acid solution is thereafter typically used as feed source of pure actinium for the preparation of bismuth-213. That hydrochloric acid solution can be used to prepare bismuth-213 such as the feed source of purified actinium to a multicolumn selectivity inversion generator (MSIG) as is described in the previously noted application Serial No. 60/372,327 filed Apr. 12, 2002 and application Ser. No. 10/159,003 filed May 31, 2002.

The separated nitric or hydrochloric acid solution of radium ions can be used to strip the actinium and radium ions from the first separation medium. That nitric or hydrochloric acid solution can be used alone or can be combined with a further, radionuclide ion-free solution of nitric or hydrochloric acid.

In one particular multicolumn selectivity inversion generator embodiment, the $^{225}$Ac and its immediate radiogenic parent radium-225 ($^{225}$Ra) are extracted from a sulfate solution of the $^{229}$Th parent (and its radiogenic descendents as well as one or more other radionuclidic impurities) by a primary separation column containing a sulfonic acid cation-exchange resin. This $^{229}$Th-containing eluate is preferably then stored for future ingrowth of $^{225}$Ra and $^{225}$Ac After rinsing with an ammonium sulfate solution free of radionuclides, the $^{22}$5Ac and $^{225}$Ra are stripped with greater than 5 M nitric or hydrochloric acid and passed through a guard column that retains Th(IV) while the $^{225}$Ac and $^{225}$Ra elute. The desired $^{225}$Ac is then preferably purified further by separation from the radium using an extraction chromatographic material that is selective for Ac(III) over Ra(II).

The $^{225}$Ac is then stripped using dilute hydrochloric acid such as 0.10 M HCl, which is directly compatible with the multicolumn selectively inversion generator developed for $^{213}$Bi. The $^{225}$Ra solution that elutes through the third column is preferably recycled for use in stripping the cation-exchange column used for the next batch of $^{229}$Th.

This generator method (process) requires comparatively small chromatographic columns and minimizes losses of $^{229}$Th while permitting the reliable production of $^{225}$Ac of high chemical and radionuclidic purity. Additionally, in preferred practice, the separation media for each of the first two separations provide a decontamination factor (DF) of at least about $10^2$ so that the combined decontamination factor for both steps is about $10^4$ or greater. In some other preferred instances, the DF for the first two steps is about $10^4$ or greater, but both DF values are not at least about $10^2$, as where one DF value is about $10^1$ and the other is about $10^3$.

The separation media used herein are preferably themselves polymeric or based on a polymer that is coated with extractant molecules. These polymers are preferably particulate. Many separation medium particles are generally spherical in shape and exhibit consistent size and morphology. Other separation particles are irregularly shaped and non-spherical. Both particle types are often referred to as resin beads, or more simply as beads. Sheets, webs, fibers or other solid forms of separation medium can also be used.

The separation media contemplated herein are typically water-insoluble. Where a separation medium is comprised of a particulate material such as a polymer that is coated with an extractant, that extractant is also water-insoluble. A material is deemed water-insoluble for purposes of this invention if it has a solubility in water at 25° C. of about five parts in ten thousand (0.05%) or less, and preferably about one part in ten thousand (0.01%) or less, and most preferably about five parts in one hundred thousand or less (0.005%).

Many of the separation media useful herein are comprised of a solid phase support that is "coated" with an extractant. It is to be understood that the word "coat" in its various grammatical forms is used herein to distinguish those separation media in which the extracting group is chemically attached to and is an integral part of the separation medium from those media in which the extractant is physically attached to the solid support and in connection with which the word "coat" is used. The coating need not be complete, so there can be gaps in the coating. In addition, porous and nonporous solid phase supports are contemplated here so that a coating can be present on the outer surface of a support as well as within the pores or other portions of the support. The word "coat" is also intended to include extractants that are "sorbed" (adsorbed and absorbed) on to a solid support.

The word "inert" is used herein to refer to support media that do not react with the coating extractant or in the aqueous medium used. It is understood that some radiolytic reactions can occur to an inert support and that minimal reactions can occur between the support and the aqueous phase, but that such reactions are minimal and do not interfere with a contemplated separation.

The first separation medium is preferably present in a chromatography column referred to herein as a primary separation column. The second and third separation media are preferably present in secondary and tertiary separation columns, respectively.

The difference in affinities for the primary separation medium of the desired actinium daughter from the thorium parent ions under the conditions used for the contacting is evidenced by a decontamination factor (DF) value of about $10^2$ or greater, to about $10^5$ or greater. It is preferred that the DF of the desired actinium daughter ions from the parent thorium ion radionuclide impurities for each the first and second separation media under the conditions of contact be about $10^2$ or greater (more).

The decontamination factor, its definition and calculation are discussed hereinafter. A separation that exhibits a DF of at least about $10^2$ provides a basis for a stated ion being substantially absent from a solution.

Thus, the preferred combined use of the two separation media and contacting conditions can provide a DF of about $10^4$ or greater. A DF value of about $10^4$ or greater can also be achieved using the first separation medium alone. Appropriate pairing of a second guard column of second separation medium and separation conditions can afford a combined decontamination factor of desired daughter from parent radionuclide of about $10^4$ or greater, and preferably about $10^6$ or greater, up to about $10^{10}$ or greater, under the conditions of contacting the multiple separation media.

DF values for radium ions that can be and typically are present during separations using the first and second separation media are not utilized for ease of discussion. DF values for radium and actinium for the third separation medium, when used, are utilized as those two species are the principal ingredients present in the solution. DF values of at least about $10^2$ or greater, and more preferably about $10^3$ or greater are typically utilized.

The DF value for a given step is multiplied with the DF value for the next step or, when represented using exponents, the DF value exponents are added for each step. A DF value of about $10^{10}$ is about the largest DF that can be readily determined using typical radioanalytical laboratory apparatus.

The aqueous sulfate ion-containing solution that also contains at least thorium and actinium ions can contain about 0.05 to about 4.0 M sulfate ions. A sulfate concentration of about 0.1 to about 0.7 molar is preferred, with a concentration of about 0.3 to about 0.5 molar being most preferred. A water-soluble sulfate salt is utilized and can be constituted by one or more sulfate salts. Exemplary sulfate salts include lithium sulfate, sodium sulfate, potassium sulfate, ammonium sulfate, rubidium sulfate, cesium sulfate, magnesium sulfate, manganese sulfate, ferrous sulfate, ferric sulfate, cobalt sulfate, nickel sulfate, copper sulfate, zinc sulfate, and cadmium sulfate.

The actinium- and thorium-containing solution can have a pH value of about zero to about 8, but is preferably acidic; i.e., less than pH 7. More preferably, the solution has a pH value of about 1 to about 3, and most preferably, that pH value is about 1.5 to about 2.5.

The parental thorium ion concentration and daughter radionuclide ion concentrations can be quite broad. Each of thorium, actinium and radium ions can be present in as little as $10^{-15}$ M, which can be detected radiologically. Thorium can be present up to about 0.75 M, actinium can be up to about 0.5 M and radium can be present up to about $10^{-3}$ M.

The first separation medium contained in the primary separation column (PSC) is preferably a polymeric extractant containing a plurality of sulfonate groups. Such materials are well-known strong acid cation-exchange media or resins. Exemplary materials include Bio-Rad® 50W-X8 resin in the $H^+$ form and Bio-Rad® AGMP-50 resin, which are commercially available from Bio-Rad Laboratories, Inc., of Richman, Calif., Eichrom® 50Wx8 sulfonic acid cation-exchange resins available from Eichrom Technologies, Inc. of Darien, Ill. Other useful strong acid cation exchange media include the Dowex® 50W series of ion exchange resins, the Amberlite® IR-120 and IR-130 gel-type resins, the Amberlite® CG-120 gel-type and Amberlite® 200 macroreticular-type series of ion-exchange resins that are available from Sigma Chemical Co., St. Louis, Mo., or ICN Biomedicals, Inc., Costa Mesa, Calif.

A contemplated second separation medium comprises dipentyl pentylphosphonate (DAAP) extractant coated on an inert solid support. One preferred second separation medium is commercially available from Eichrom Technologies, Inc., located at 8205 S. Cass Avenue, Darien, Ill., under the mark UTEVA®. The UTEVA® Resin is 40 percent DAAP extractant on 50–100 μm Amberchrom®-CG71. Another preferred separation medium also available from Eichrom Technologies, Inc. is sold under the trademark UTEVA®-2 Resin and contains an equimolar mixture of Cyanex®-923 extractant (a mixture of n-alkyl phosphine oxides available from Cytec Industries, Inc., West Paterson, N.J.) and DAAP loaded to 40 percent on 50–100 μm Amberchrom®-CG71. The components of Cyanex®-923 are understood to include trihexylphosphine oxide, trioctylphosphine oxide, as well as dihexyloctylphosphine oxide and dioctylhexylphosphine oxide. Another preferred separation medium also available from Eichrom Technologies, Inc. is 40 percent 2-ethylhexyl-2-ethylhexylphosphonic acid on an inert chromatographic substrate.

The TEVA™ resin, having a quaternary ammonium salt, specifically, a mixture of trioctyl and tridecyl methyl ammonium nitrates or chlorides, sorbed on an inert water-insoluble support, is highly selective for ions having the tetravalent oxidation state. For example, the +4 valent thorium ions are bound to the TEVA™ resin in nitric acid solution, whereas the actinium (Ac) and radium (Ra) ions (whose valencies are +3 and +2, respectively) are not substantially extracted by contact with this resin under the same conditions. The TEVA™ resin is commercially available from Eichrom Technologies, Inc.

A contemplated third separation medium that can be used to bind actinium ions in the presence of radium ions is comprised of a tetra-$C_1$–$C_{10}$-alkyl diglycolamide coated on inert support particles. Illustrative alkyl groups include methyl, ethyl, propyl, iso-propyl, butyl, hexyl, octyl, nonyl and decyl groups. One preferred third separation medium is available under the trademark Yttrium Resin binds aqueous actinium ions in the presence of radium ions. This separation medium utilizes a coating of N,N,N',N'-tetra-n-octyl diglycolamide (TO-DGA) extractant loaded to about 10 to about 45 weight percent on an inert resin substrate that is a nonionic acrylic ester polymer bead resin such as Amberlite® XAD-7 or an inert, porous support such as polymeric resin (e.g., Amberchrom®-CG71).

More specifically, the illustrative third solid phase separation medium contains about 40 weight percent TO-DGA coated on Amberchrom-CG71, and is referred to as Yttrium Resin. The Yttrium Resin is commercially available from Eichrom Technologies, Inc.

The active component N,N,N',N'-tetra-n-octyl diglycolamide (TO-DGA) can be mixed with a lower boiling organic solvent such as methanol, ethanol, acetone, diethyl ether, methyl ethyl ketone, hexanes, or toluene and coated onto an inert support, such as glass beads, polypropylene beads, polyester beads, or silica gel as known in the art for use in a chromatographic column. Acrylic and polyaromatic resins such as AMBERLITE®, commercially available from Rohm and Haas Company of Philadelphia, Pa., can also be used.

TO-DGA and similar tetraalkyl diamides dissolved in a water-insoluble organic solvent such as nitrobenzene, chloroform, toluene or an alkane such as n-hexane or n-dodecane reported to be useful for the liquid/liquid extraction of lanthanide and actinide cations from aqueous nitric and perchioric acid solutions. [Sasaki et al., *Solvent Extr. Ion Exch.* 2001, 19(1), 91–103; and Sasaki et al., *Solvent Extr. Ion Exch.* 2002, 20(1), 21–34. See, also the web site jaeri-.go.jp/english/press/000808/and Japanese Kokai No. 2002-1007 and No. 2002-243890.]

Octyl(phenyl)-N,N-diisobutylcarbamoylmethylphosphine oxide, known in the art as CMPO, can be used in a separation medium. The CMPO extractant can be dissolved in tri-n-butyl phosphate and coated on an inert support such as a resin bead to provide a useful separation medium. The use of CMPO is discussed in U.S. Pat. No. 4,548,790, No. 4,574,072 and No. 4,835,107. Such a medium is commercially available from Eichrom Industries, Inc. under the name TRU Resin.

It is preferred that the decontamination factor (DF) of the desired actinium daughter ions from the parent thorium ion radionuclide impurities of each the first and second separation media under the conditions of contact be about $10^2$ or greater (more). Thus, the preferred combined use of the two separation media and contacting conditions can provide a DF of about $10^4$ or greater. A DF value of about $10^4$ or greater can also be achieved using the first separation medium alone. The decontamination factor, its definition and calculation are discussed hereinafter.

The difference in affinities of the desired actinium daughter from the thorium parent ions present under the conditions used for the contacting is evidenced by a DF value of about $10^2$ or greater, to about $10^5$ or greater for the primary separation medium. Thus, appropriate pairing of a second guard column of second separation medium and separation conditions can afford a combined decontamination factor of desired daughter from parent radionuclide of about $10^4$ or greater, and preferably about $10^6$ or greater, up to about $10^{10}$ or greater, under the conditions of contacting the multiple separation media.

The DF value for a given step is multiplied with the DF value for the next step or, when represented using exponents, the DF value exponents are added for each step. A DF value of about $10^{10}$ is about the largest DF that can be readily determined using typical radioanalytical laboratory apparatus.

The fundamental differences between a contemplated multicolumn selectivity inversion generator technology and the conventional methodology are at least three-fold: (1) the storage medium for the parent radionuclides is a solution rather than a solid support, (2) the desired daughter radionuclide is selectively extracted from the parent radionuclide-containing solution when needed, and (3) a second separation medium prevents the exit of parent radionuclides from the generator system.

In addition to minimizing radiolytic damage to the chromatographic support, extraction of the minute masses of daughter (i.e., the minor constituent) by use of the multicolumn selectivity inversion generator permits the use of small chromatographic columns. Thus, the desired daughter radionuclide can be recovered in a small volume of solution that is conveniently diluted to the appropriate dose for clinical use. Typically, 90 percent of the daughter radionuclide can be delivered in less than about five bed volumes of the first separation medium of the first column.

A contemplated separation method is typically carried out at ambient room temperature. Gravity flow through the columns can be used, but it is preferred that the separation be carried out at more than one atmosphere of pressure as can be provided by a hand-operated syringe or electric pump. The use of less than one atmosphere of pressure as can be achieved by use of a syringe is also preferred.

The time of contact between a solution and a separation medium is typically the residence time of passage of the solution through a column under whatever pressure head is utilized. Thus, although one can admix a given solution and separation medium and maintain the contact achieved there between a period of hours or days, sorption by the separation medium is usually rapid enough; that is, the binding and phase transfer reactions are sufficiently rapid, that contact provided by flow over and through the separation medium particles provides sufficient contact time to effect a desired separation.

The present method is typically configured to operate substantially free from air or gas, thereby permitting better chromatographic performance. The presence of interstitial gas pockets can result in the solution passing through the channel without flowing over, through or around the beads; rather, the solution passes through the channel without contacting the separation medium. Specifically, air or gas traveling through a separation medium can cause channeling in which less than the desired intimate contact between the solution and the separation medium can occur. As such, the columns used in a contemplated method are configured as a system for transporting and processing liquids.

Another advantage to such an air- or gas-less system is that there is no air or gas that must be sterilized by filtration through sterile air filters. As such, the components used in a contemplated method can be of a less complicated design than those that use combinations of air and liquid.

In a preferred method that utilizes separation medium beads, the support beads that comprise the separation medium are packed into a column. When a solution is passed through the beads, the solution can flow over, through and around the beads, coming into intimate contact with the separation medium.

The Decontamination factor (DF) is defined using the following equation:

$$DF = \left( \frac{\dfrac{[Analyte]_{effluent}}{[Impurity]_{effluent}}}{\dfrac{[Analyte]_{influent}}{[Impurity]_{influent}}} \right)$$

For a system at radioactive steady state (e.g., $^{229}$Th and its daughters including $^{225}$Ac, $^{225}$Ra and $^{213}$Bi), the denominator is about 1. This means a DF value can be approximated by examining the stripping peak in a chromatogram and dividing the maximum cpm/mL for the analyte (i.e., the desired $^{225}$Ac and $^{225}$Ra daughter radionuclides) by the activity of the impurities (i.e., $^{229}$Th parent).

Alternatively, the DF value can be calculated by taking the ratio of the dry weight distribution ratios ($D_w$) for an analyte and impurity. The dry weight distribution ratio is defined as:

$$D_w = \left(\frac{A_o - A_f}{A_f}\right)\left(\frac{V}{m_R \cdot (\%\ \text{solids}/100)}\right)$$

where $A_o$=the count rate in solution prior to contact with the resin, $A_f$=the count rate in solution after contact with resin, V=volume (mL) of solution in contact with resin, $m_R$=mass (g) of wet resin, and the % solids permits conversion to the dry mass of resin. Presuming that the "influent" is at radioactive steady state (making the denominator for DF unity), the ratio of $D_w$ values for analyte/impurity are:

$$DF = \frac{\left(\frac{A_o - A_f}{A_f}\right)^{analyte} \Big/ \left(\frac{V}{m_R \cdot (\%\ \text{solids}/100)}\right)}{\left(\frac{A_o - A_f}{A_f}\right)^{impurity} \Big/ \left(\frac{V}{m_R \cdot (\%\ \text{solids}/100)}\right)}$$

which simplifies after cancellation to:

$$DF = \frac{\left(\frac{A_o - A_f}{A_f}\right)^{analyte}}{\left(\frac{A_o - A_f}{A_f}\right)^{impurity}}$$

where $A_o$, $A_f$, V, $m_R$ and % solids are as previously defined. These ratios of activities are proportional to the molar concentrations cited elsewhere in the definition of DF. Dry weight distribution ratios ($D_w$) are determined radiometrically by batch contacts of the separation media with the desired solutions at 25(±2)° C.

EXAMPLE 1

Preparation of Yttrium (TO-DGA) Resin

The separation medium used herein containing TO-DGA was prepared using a general procedure described previously for another separation medium [Horwitz et al., *Anal. Chem.* 1991, 63, 522-525]. A portion of TO-DGA (4.0 g) was dissolved in about 30 mL of $CH_3OH$ and combined with 50-100 μm Amberchrom-CG71 particles (6.0 g) in about 20 mL of $CH_3OH$. The mixture was rotated at about 40° C. on a rotary evaporator for about 30 minutes, after which the $CH_3OH$ was vacuum distilled. After the bulk $CH_3OH$ had been distilled, the free flowing resin was rotated under vacuum at about 40° C. for another 30 minutes to remove residual $CH_3OH$. The resulting solid is referred to as Yttrium Resin and corresponds to 40% (w/w) loading of TO-DGA on 50–100 μm Amberchrom-CG71 particles.

EXAMPLE 2

Extraction Studies with Yttrium Resin

The TO-DGA molecules behave as neutral extractants; that is, solute loading occurs at high acid (e.g., nitric ($HNO_3$) or hydrochloric (HCl) acids) or salt concentrations (e.g., lithium nitrate ($LiNO_3$) or aluminum nitrate ($Al(NO_3)_3$) and stripping is accomplished using dilute acid or salt solutions. One particularly noteworthy characteristic of the TO-DGA resin, shown below, is the high uptake of polyvalent cations from 0.1–5 molar $HNO_3$ and the efficient stripping of these same cations using dilute (≦0.5 M) HCl. The elution behavior of several tri-, tetra-, and hexavalent cations on TO-DGA extraction chromatographic material described before are tabulated below.

Elution Behavior of Selected Cations on TO-DGA Resin*

| | | Percent of Total | | | |
|---|---|---|---|---|---|
| Fraction | Bed Volume | Al | Y | Th | U |
| Load (0.5 M $HNO_3$) | 2.0 | 66 | 0 | 0 | 0 |
| Rinse (0.1 M $HNO_3$) | 2.0 | 28 | 0 | 0 | 75 |
| | 2.0 | 0 | 0 | 0 | 8.4 |
| | 2.0 | 0 | 0 | 0 | 0 |
| | 2.0 | 0 | 0 | 0 | 0 |
| | 2.0 | 0 | 0 | 0 | 0 |

-continued

Elution Behavior of Selected Cations on TO-DGA Resin*

| | | Percent of Total | | | |
|---|---|---|---|---|---|
| Fraction | Bed Volume | Al | Y | Th | U |
| Strip (0.1 M HCl) | 2.0 | 0 | 24 | 78 | 0 |
| | 2.0 | 0 | 76 | 16 | 0 |
| | 2.0 | 0 | 0 | 0 | 0 |
| | 2.0 | 0 | 0 | 0 | 0 |
| | 2.0 | 0 | 0 | 0 | 0 |

*Bed volume = 0.5 mL; Flow rate = 0.1 mL/min for load, rinse, and strip

The negligible affinity of the TO-DGA resin for Al permits convenient purification of analytes from this frequently encountered matrix cation. The elution of U in 0.1 M $HNO_3$, while Th is retained is noteworthy, as this separation can be accomplished at significantly lower acid concentrations than employed using conventional anion exchange or quaternary alkylamine extraction chromatographic materials. The extraction behavior of the TO-DGA resin is useful in the separation and concentration of tri-, tetra-, and hexavalent cations and in the crossover from nitrate to chloride media (the medium of choice for medical applications).

Data relevant to the use of the TO-DGA resin separation media includes:

TO-DGA Formula Weight=581.0

Column Capacity:

40% (w/w) TO-DGA on Amberchrom-CG71

Bed density=0.35 g/mL of bed 0.40×0.35=0.140 g of TO-DGA/mL of bed or 0.241 mmol of TO-DGA/mL of bed Column Capacity for $Sr^{2+}$ and $Ra^{2+}$ Assume three TO-DGA per $Sr^{2+}$or $Ra^{2+}$0.0803 mmol mL of bed Column Capacity for $Yb^{3+}$:

Assume 4 DGA per $Yb^{3+}$:

0.24/4=0.06 mmol of $Yb^{3+}$/mL of bed 11 mg of $Yb^{3+}$/mL of bed

EXAMPLE 3

Thorium From Daughters Separation Scheme

Adapting the fundamental concept of using an aqueous phase complexing agent to preclude Th(IV) uptake by the extraction medium to operate within the context of a robust process led to consideration of inorganic anions as aqueous phase complexing agents. Because macroquantities of Th(IV) are present, the $NO_3^-$ salts are a logical choice due to the high solubility of $Th(NO_3)_4$ in aqueous media. Unfortunately, most $NO_3^-$-based extraction systems require polycarboxylate complexing agents [to keep Th(IV) off the extraction medium] or require extraction of Th(IV) macroconstituent. A similar analysis of $Cl^-$ and $PO_4^{3-}$ systems provided various shortcomings, including a lack of solubility of Th(IV) salts of the latter anion.

Sulfate ($SO_4^{2-}$) ion solutions represent an interesting possibility because, at first intuition, Th(IV) is not anticipated to be soluble in such media. Thorium sulfate is, however, an aqueous-soluble salt and the solubilities can be increased further by use of readily soluble $SO_4^{2-}$ salts. An investigation of Th(Iv) uptake by cation-exchange resins in $SO_4^{2-}$ media indicated that the uptake of Th(IV) was appreciably less than that of Ce(III) [used as an analog for Ac(III)]. This effect is presumably due to the stronger complexes formed between Th(IV) and $SO_4^{2-}$ than for the $SO_4^{2-}$ complexes of Ce(III) [or Ac(III)].

FIG. 1 shows a schematic flow sheet for the separation of submicromolar concentrations of Ra(II) and Ac(III) from Th(IV) present either as a micro- or macroconstituent. In this flow sheet, the Th(IV) is stored in a 0.40 M $(NH_4)_2SO_4$ solution at pH=2.0(±0.1) until ingrowth of $^{225}$Ra and $^{225}$Ac has approached radioactive steady state. At this point, the Th(IV)/$SO_4^{2-}$ solution is eluted on a conventional cation-exchange resin primary separation column that retains the Ac(III) and Ra(II) nuclides while more than 98% of the Th(IV) elutes.

After rinsing with more 0.40 M $(NH_4)_2SO_4$ at pH=2.0 (±0.1), the Ra(II) and Ac(III) are stripped using 6.0 M $HNO_3$. Because trace Th(IV) may be present and because preservation of the $^{229}$Th(IV) supply is critical, a UTEVA Resin guard column further removes adventitious Th(IV) impurities. The Th(IV) retained by the UTEVA Resin guard column can be recovered using the 0.40 M $(NH_4)_2SO_4$ solution at pH=2.0(±0.1) and recombined with the original Th(IV) stock solution.

The Ac(III) and Ra(II) mixture is subsequently contacted with the Yttrium Resin that retains Ac(III) while the Ra(II) elutes. After rinsing, the recovery of Ac(III) is accomplished by eluting with 0.10 M HCl, which produces $^{225}$Ac(III) in the 0.10 M HCl solution required for use in the $^{213}$Bi generator. The Ra(II) in 6.0 M $HNO_3$ eluate from the Yttrium Resin can be recycled and used to strip future batches of Ra(II) and Ac(III) from the cation-exchange resin, as shown in FIG. 1. This $^{225}$Ra recycle option permits the most efficient use of $^{225}$Ra to produce $^{225}$Ac(III), while simultaneously minimizing the losses of the $^{229}$Th source material.

EXAMPLE 4

Separation of Thorium From Daughters Using A Sulfonate Cation-Exchange Resin

Figure 2:
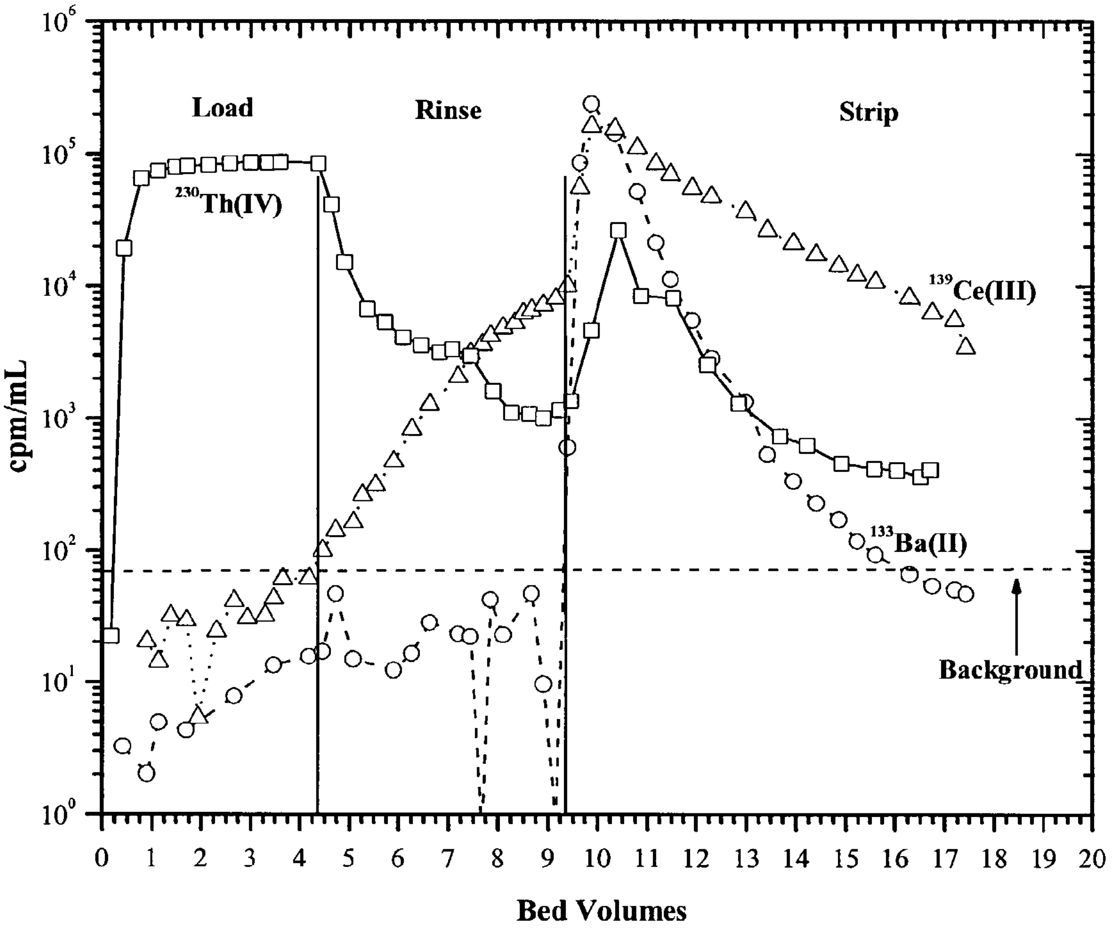
FIG. 2 is a chromatographic graph of counts per minute per milliliter (cpm/mL) of eluate versus bed volumes (BV) of eluate passed through a column at 25(±2)° C. during the loading (0.0–4.5 BV), rinsing (4.5–9.25 BV), and stripping phases (9.25–18 BV) in the separation of 0.10 M $Th(SO_4)_2$ [spiked with $^{230}Th(Iv)$; (open squares)] from tracer $^{133}Ba(II)$ [open circles] and $^{139}Ce(III)$ [open triangles] using a 0.50 mL bed of AG-50Wx8 sulfonic acid cation-exchange resin. Load: 2.0 mL 0.10 M $Th(SO_4)_2$ in 0.40 M $(NH_4)_2SO_4$ at pH=2.0(±0.1), rinse (and preconditioning solution): 0.40 M $(NH_4)_2SO_4$ at pH=2.0(1), Strip: 6.0 M $HNO_3$. The horizontal dashed line indicates background counts.
Figure 3:
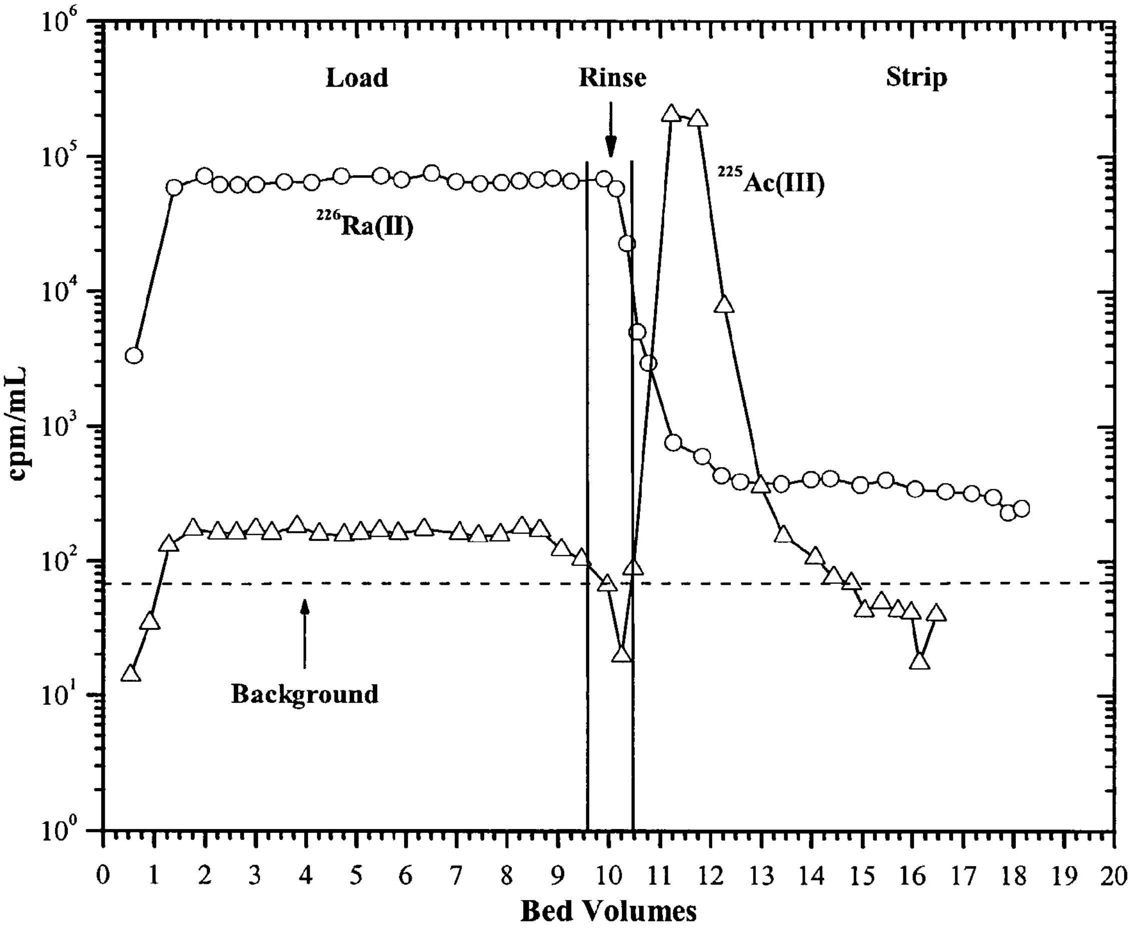
FIG. 3 is a graph showing chromatographic results in cpm/mL vs. bed volumes of eluate for the separation of Ac(III) from Ra(II) using a 0.50 mL bed of Yttrium Resin. Load: 5.0 mL of 6.0 M $HNO_3$ eluate from a UTEVA Resin Guard Column spiked with $^{225}Ac(III)$ and $^{226}Ra(II)$, rinse (and preconditioning solution): 6.0 M $HNO_3$, strip: 0.10 M HCl.

FIG. 2 shows the elution of 0.10 M $Th(SO_4)_2$ in 0.40 M $(NH_4)2SO_4$ at pH=2.0(±0.1) at 25(±2)° C. on a cation-exchange resin (Eichrom Technologies, 50Wx8) in which rapid breakthrough of $^{230}$Th(IV) is observed. A recovery of more than 98% of $^{230}$Th(IV) through about 5.4 bed volumes is shown, with minimal breakthrough of $^{139}$Ce(III) and $^{133}$Ba(II) [used as an analog for Ra(II)] during loading. After extensive rinsing (i.e., more than two bed volumes), breakthrough of $^{139}$Ce(III) is observed, but negligible losses are incurred during the first 1–2 bed volumes. Breakthrough of $^{133}$Ba(II) is not observed during the load or rinse, and it is expected that elution of Ra(II) would be even less likely given its higher affinity for conventional cation-exchange resins. The 99 and 90% recoveries of $^{133}$Ba(II) and $^{139}$Ce (III), respectively, in five bed volumes of strip using 6.0 M $HNO_3$ are noteworthy. Examination of the stripping peak maximum for $^{133}$ a(II) and $^{139}$Ce(III) in FIG. 2 suggests a conservative decontamination factor (DF) of more than 102 for this separation. The data points for $^{230}$Th shown in the stripping region do not substantially represent $^{230}$Th as radioactive decay products, but are from natural Th interfere with the $^{230}$Th assay. Independent spectroscopic and ICP-AES studies have confirmed less than 2% Th(IV) contamination in the stripping region. The very low solubility of $RaSO_4$ was initially suspected to be a major shortcoming of this separation system, especially given the common ion effect in the presence of 0.40 M $(NH_4)_2SO_4$. A more detailed assessment suggested, however, that the low $RaSO_4$ solubility may not be the limiting factor as: (1) only trace Ra(II) would be present during typical processing and would likely never exceed 1 μM during typical processing, (2) $RaSO_4$ is most frequently precipitated in the presence of macroconcentrations of a Ba(II) carrier, and (3) the shorter half-life of $^{225}$Ra (14.8 days) compared to the $^{226}$Ra (1600 years) may result in a less stable microcrystalline lattice that impedes precipitation.

EXAMPLE 5

Radium Sulfate Does Not Interfere

Figure 4:
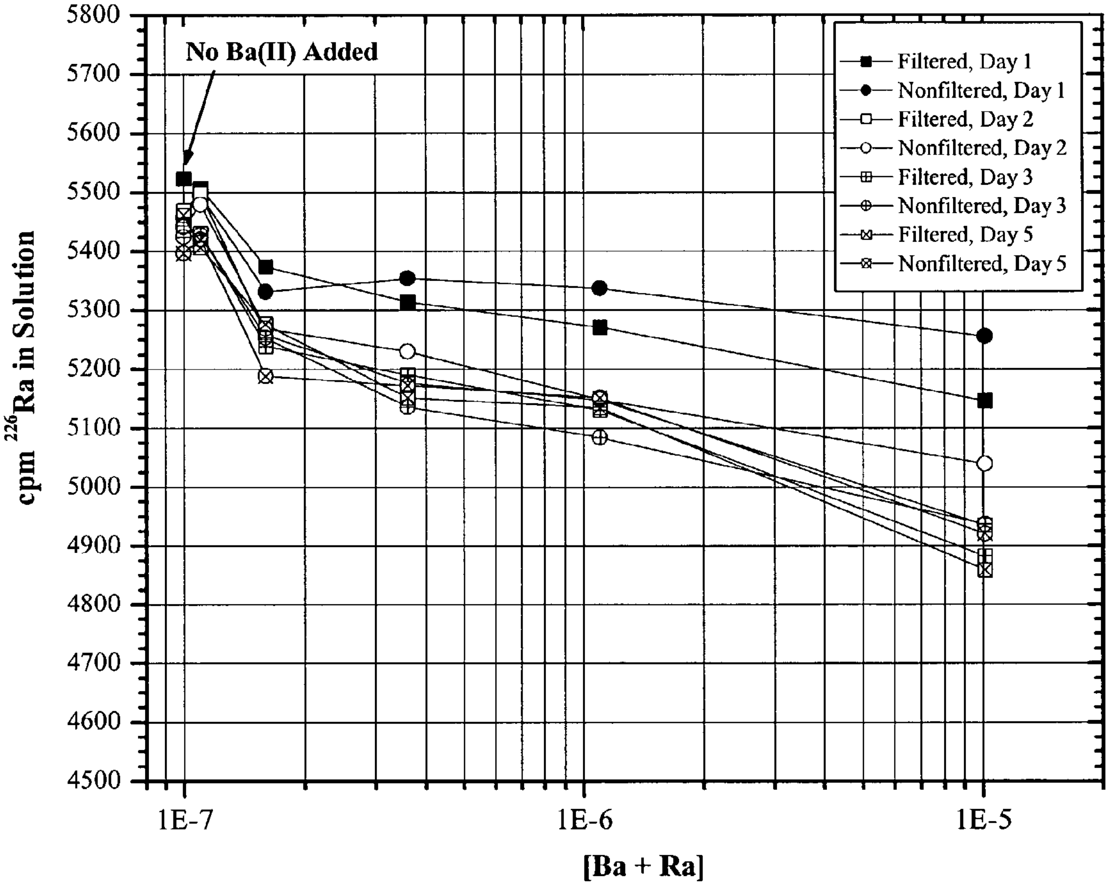
FIG. 4 is a graph that shows the counts per minute (cpm) for $^{226}Ra$ in a solution of 0.40 M $(NH_4)_2SO_4$ containing 0.10 M $Th(SO_4)_2$ at pH=2(±0.1) and 25(±2)° C. versus the concentration of barium and radium ions [Ba+Ra] in which filtered and non-filtered samples were taken over a five day time period.

FIG. 4 shows the results of a solubility study in which increasing amounts of Ba(II) were added to a solution of $^{226}$Ra(II) while the solution phase activity was monitored. Over 93% of the $^{226}$Ra activity remains in solution when the cumulative Ba(II)+Ra(II) concentration exceeded 1 μm, which suggests that Ra(II) solubility is not a significant issue. Further, the use of a Ra isotope of shorter half-life than $^{226}$Ra is expected to further reduce the likelihood of $RaSO_4$ precipitation. The results shown in FIGS. 2 and 4 represent the proof of principle and the selection of the near optimal conditions for the separation of Ra(II) and $^{225}$Ac(III) from Th(IV).

Each of the patents, applications and articles cited herein is incorporated by reference. The use of the article "a" or "an" is intended to include one or more.

From the foregoing it will be observed that numerous modifications and variations can be effectuated without departing from the true spirit and scope of the novel concepts of the invention. It is to be understood that no limitation with respect to the specific embodiment illustrated is intended or should be inferred. The disclosure is intended to cover by the appended claims all such modifications as fall within the scope of the claims.

What is claimed:

1. A method for producing a solution of actinium and optionally present radium daughter radionuclide ions that is substantially free of thorium parental radionuclide ion impurities comprising the steps of:

(a) contacting an aqueous parent-daughter radionuclide ion solution having a pH value of about 8 or less that contains sulfate ions as well as thorium parental radionuclide ions and actinium and optionally present radium desired daughter radionuclide ions with a first solid phase separation medium having a high affinity for the desired daughter radionuclide ions and a low affinity for the parent radionuclide ions, and maintaining that contact for a time period sufficient for said actinium and optionally present radium ions to be bound to form a desired daughter ion-laden first separation medium and a thorium ion-containing, desired daughter-depleted parent-daughter solution;

(b) separating the thorium ion-containing desired daughter-depleted parent-daughter solution from the solid phase desired daughter ion-laden first separation medium;

(c) stripping the desired daughter radionuclide from the desired daughter-laden first separation medium with an aqueous nitric or hydrochloric acid solution to form an aqueous nitric or hydrochloric acid solution of actinium and optionally present radium desired daughter radionuclide ions that may contain trace amounts of parental thorium ion impurities;

(d) contacting said aqueous nitric or hydrochloric acid solution of actinium and optionally present radium desired daughter radionuclide ions that may contain trace amounts of parental thorium ion impurities of step (c) with a second solid phase separation medium that has a high affinity for the parent thorium radionuclide ions and a low affinity for the actinium and optionally present radium desired daughter radionuclide, and maintaining that contact for a time period sufficient for the parent thorium radionuclide to be bound by the second solid phase separation medium to form a solution of actinium and optionally present radium desired daughter radionuclide ions that is highly purified and is substantially free of thorium parental radionuclide ion impurities; and (e) separating the solid and solution phases to provide a solution of actinium and optionally present radium desired daughter radionuclide ions that is highly purified and is substantially free of thorium parental radionuclide ion impurities.

2. The method according to claim 1 wherein the decontamination factor of the first separation medium is about $10^2$ or greater for the actinium desired daughter from the thorium parent radionuclide impurities under the conditions of contact.

3. The method according to claim 1 wherein said first separation medium is particulate.

4. The method according to claim 3 wherein said separation medium is comprised of a water-insoluble polymeric sulfonate group-containing cation-exchange resin.

5. A method f or producing a solution of actinium and optionally present radium daughter radionuclide ions that is substantially free of thorium parental ion impurities comprising the steps of:

(a) contacting an aqueous parent-daughter radionuclide ion solution having a pH value of about 8 or less that contains sulfate ions as well as thorium parental radionuclide ions and actinium and optionally present radium desired daughter radionuclide ions with a first solid phase separation medium that provides a decontamination factor of about $10^2$ or greater for the actinium and optionally present radium desired daughter ions from the thorium parent ion impurities under the conditions of contact, said separation medium comprising water-insoluble polymeric sulfonate group-containing cation-exchange resin particles, and maintaining that contact for a time period sufficient for said actinium and optionally present radium ions to be bound by the solid phase first separation medium to form desired daughter ion-laden separation medium and a thorium ion-containing, desired daughter-depleted parent-daughter solution;

(b) separating the thorium ion-containing, desired daughter-depleted parent-daughter solution from the solid phase desired daughter ion-laden separation medium;

(c) stripping the desired daughter radionuclide from the desired daughter-laden separation medium with an aqueous nitric or hydrochloric acid solution to form an aqueous nitric or hydrochloric acid solution of actinium and optionally present radium desired daughter radionuclide ions that may contain trace amounts of parental thorium ion impurities;

(d) contacting said aqueous nitric or hydrochloric acid solution of actinium and optionally present radium desired daughter radionuclide ions that may contain trace amounts of parental thorium ion impurities of step (c) with a second solid phase separation medium that provides a decontamination factor of about $10^2$ or greater for the actinium and optionally present radium desired daughter ions from the thorium parent ion impurities under the conditions of contact, and maintaining that contact for a time period sufficient for the parent thorium radionuclide that may be present to be bound by the second solid phase separation medium to form a solution of actinium and optionally present radium desired daughter radionuclide ions that is highly purified and is substantially free of thorium parental radionuclide ion impurities; and (e) separating the solid and solution phases to provide a solution of actinium and optionally present radium desired daughter radionuclide ions that is highly purified and is substantially free of thorium parental radionuclide ion impurities.

6. The method according to claim 5 wherein the decontamination factor of said second solid phase separation medium is about $10^2$ or more for actinium desired daughter radionuclide ions from thorium parental and other daughter radionuclide ion impurities under the conditions of contact.

7. The method according to claim 5 wherein the sulfate ions of said aqueous sulfate ion-containing parent-daughter radionuclide ion solution are provided by a water-soluble sulfate salt selected from the group consisting of lithium sulfate, sodium sulfate, potassium sulfate, ammonium sulfate, rubidium sulfate, cesium sulfate, magnesium sulfate, manganese sulfate, ferrous sulfate, ferric sulfate, cobalt sulfate, nickel sulfate, copper sulfate, zinc sulfate, and cadmium sulfate.

8. The method according to claim 5 wherein said second solid phase separation medium comprises (a) dipentyl pentylphosphonate extractant coated on an inert solid support, (b) a mixture of trioctyl and tridecyl methyl ammonium chlorides or nitrates sorbed on an inert water-insoluble support, (c) an anion exchange resin, or (d) 40 percent 2-ethylhexyl-2-ethylhexylphosphonic acid on an inert chromatographic substrate.

9. The method according to claim 5 wherein the aqueous nitric acid stripping solution of step (c) has a concentration of about 5 molar or greater.

10. The method according to claim 5 including the further step of recovering said solution of actinium and optionally present radium desired daughter radionuclide ions that is highly purified and is substantially free of thorium parental radionuclide ion impurities.

11. The method according to claim 5 including the further step of maintaining said separated thorium ion-containing, desired daughter-depleted parent-daughter solution of step (b) for a time period sufficient for an additional amount of actinium and optionally present radium daughter radionuclide ions to form by radioactive decay, and repeating said separation using said solution containing the newly formed actinium and radium radionuclide ions as said aqueous parent-daughter radionuclide ion solution having a pH value of about 8 or less that contains sulfate ions as well as parental thorium ions and actinium and optionally present radium desired daughter radionuclide ions.

12. The method according to claim 5 wherein said aqueous parent-daughter radionuclide ion solution having a pH value of about 8 or less that contains sulfate ions as well as actinium and optionally present radium desired daughter radionuclide ions is acidic.

13. The method according to claim 5 wherein radium ions are present in said aqueous parent-daughter radionuclide ion solution of step (a) and are also present in said separated solution of step (e).

14. The method according to claim 13 including the further steps of;

(f) contacting said separated solution of step (e) with a solid phase separation medium that provides a decontamination factor of about $10^2$ or greater for the actinium ions from radium ions under the conditions of contact, and maintaining that contact for a time period sufficient to form solid phase actinium-laden separation medium and a radium ion-containing, actinium-depleted solution;

(g) separating the solid and liquid phases formed; and (h) stripping the actinium ions from said solid phase actinium-laden separation medium with dilute hydrochloric acid to form a solution of actinium ions in hydrochloric acid.

15. The method according to claim 5 wherein said aqueous parent-daughter radionuclide ion solution having a pH value of about 8 or less that contains sulfate ions as well as actinium and optionally present radium desired daughter radionuclide ions has a sulfate ion concentration of about 0.05 to about 4.0 M.

16. A method for producing a solution of daughter actinium radionuclide ions that is substantially free of thorium parental radionuclide ion impurities comprising the steps of:

(a) contacting an aqueous acidic parent-daughter radionuclide ion that contains about 0.05 to about 4.0 M sulfate ions as well as thorium parental radionuclide ions and actinium and radium desired daughter radionuclide ions with a first solid phase separation medium that provides a decontamination factor of about $10^2$ or greater for actinium and radium desired daughter ions from the thorium parent radionuclide ion impurities under the conditions of contact, said separation medium comprising water-insoluble polymeric sulfonate group-containing cation-exchange resin particles, and maintaining that contact for a time period sufficient for said actinium and radium ions to be bound by the solid phase first separation medium to form desired daughter ion-laden separation medium and a thorium ion-containing, desired daughter-depleted parent-daughter solution;

(b) separating the desired daughter-depleted parent-daughter solution from the solid phase desired daughter ion-laden separation medium;

(c) stripping the desired daughter radionuclide ions from the desired daughter-laden separation medium with an aqueous nitric acid solution whose nitric or hydrochloric acid concentration is about 0.5 to about 8 M or greater to form an aqueous nitric or hydrochloric acid solution of actinium and radium desired daughter radionuclide ions that may contain trace amounts of parental thorium ion impurities;

(d) contacting said aqueous nitric or hydrochloric acid solution of actinium and optionally present radium desired daughter radionuclide ions that may contain trace amounts of parental thorium ion impurities of step (c) with a second solid phase separation medium that has a decontamination factor of about $10^2$ or more for actinium desired daughter radionuclide ions from thorium parental ion impurities under the conditions of contact, said second solid phase separation medium comprising (a) dipentyl pentylphosphonate extractant coated on an inert solid support, (b) a mixture of trioctyl and tridecyl methyl ammonium chlorides or nitrates sorbed on an inert water-insoluble support, or an anionic-exchange resin, and maintaining that contact for a time period sufficient for the parent thorium radionuclide that may be present to be bound by the second solid phase separation medium to form a solution of actinium and radium desired daughter radionuclide ions that is highly purified and is substantially free of thorium parental radionuclide ion impurities;

(e) separating the solid and solution phases to provide a solution of actinium and optionally present radium desired daughter radionuclide ions that is highly purified and is substantially free of thorium parental radionuclide ion impurities;

(f) contacting said separated solution of step (e) with a third solid phase separation medium that that provides a decontamination factor of about $10^2$ or greater for the actinium ions from radium ions under the conditions of contact, and maintaining that contact for a time period sufficient to form solid phase actinium-laden separation medium and a radium ion-containing, actinium-depleted solution;

(g) separating the solid and liquid phases formed; and (h) stripping the actinium ions from said solid phase actinium-laden separation medium with dilute hydrochloric acid to form a solution of actinium ions in hydrochloric acid.

17. The method according to claim 16 wherein the sulfate ions of said aqueous sulfate ion-containing parent-daughter radionuclide ion solution are provided by a water-soluble sulfate salt selected from the group consisting of lithium sulfate, sodium sulfate, potassium sulfate, ammonium sulfate, rubidium sulfate, cesium sulfate, magnesium sulfate, manganese sulfate, ferrous sulfate, ferric sulfate, cobalt sulfate, nickel sulfate, copper sulfate, zinc sulfate, and cadmium sulfate.

18. The method according to claim 16 wherein said third solid phase separation medium is comprised of tetra-$C_1$–$C_{10}$-alkyl diglycolamide extractant coated on inert support particles.

19. The method according to claim 18 wherein said tetra-$C_1$–$C_{10}$-alkyl diglycolamide extractant is N,N,N, 'N'-tetra-n-octyl diglycolamide.

20. The method according to claim 16 wherein the pH value of the acidic sulfate ion-containing solution of step (a) is about 1 to about 3.

21. The method according to claim 16 wherein the sulfate ions of said acidic aqueous sulfate ion-containing parent-daughter radionuclide ion solution are provided by ammonium sulfate.

22. The method according to claim 16 wherein the dilute hydrochloric acid solution of step (h) contains hydrochloric acid at a concentration of about $10^{-5}$ or less to about 3.0 M.

23. The method according to claim 16 including the further step of maintaining said separated thorium ion-containing, desired daughter-depleted parent-daughter solution of step (b) for a time period sufficient for an additional amount of actinium and radium daughter radionuclide ions to form by radioactive decay, and repeating said separation using said solution containing the newly formed actinium and radium radionuclide ions as said aqueous parent-daughter radionuclide ion solution having a pH value of about 8 or less that contains sulfate ions as well as parental thorium ions and actinium and radium desired daughter radionuclide ions.

* * * * *